June 28, 1949. E. C. WAHLBERG 2,474,707
ELECTRIC MOTOR SWITCHING MECHANISM
Filed Jan. 29, 1944 2 Sheets-Sheet 1

INVENTOR.
Eric C. Wahlberg
BY
Thomas C. Betts
His Attorney

June 28, 1949. E. C. WAHLBERG 2,474,707
ELECTRIC MOTOR SWITCHING MECHANISM
Filed Jan. 29, 1944 2 Sheets-Sheet 2

INVENTOR.
Eric C. Wahlberg
BY Thomas C. Betts
His Attorney

Patented June 28, 1949

2,474,707

UNITED STATES PATENT OFFICE 2,474,707

ELECTRIC MOTOR SWITCHING MECHANISM

Eric C. Wahlberg, Stamford, Conn., assignor to Electrolux Corporation, Old Greenwich, Conn., a corporation of Delaware Application January 29, 1944, Serial No. 520,261

2 Claims. (Cl. 318—32)

My invention relates to electric switching mechanism and more particularly to a device of this type having means whereby an electric circuit or circuits therethrough may be altered, for instance by a manual operation, together with means, such as an electric motor, for subsequently restoring the circuit or circuits, the length of time required for the restoring depending upon the amplitude of the first movement and the speed of the restoring movement. Switching mechanism of this type is particularly suitable for use in connection with the electric motor circuits disclosed in my copending applications Serial No. 501,405 filed September 6, 1943, and Serial No. 508,425 filed October 30, 1943, now Patents No. 2,400,579 and No. 2,400,580 respectively, both issued May 21, 1946, to which this application relates back for all common subject matter.

In each of said applications there is more or less diagrammatically shown electric switching mechanism having a manually turnable member which may be turned in one direction in order to cause a plurality of electric motors to run in a forward direction, and which may be manually turned in the opposite direction to cause the motors to run in reverse. Moreover, the distance through which the member is manually turned determines the number of revolutions the motors will make before the circuit is opened, one of the motors being mechanically connected to reopen the switch. The switching mechanism shown in Patent No. 2,400,580 also includes means for closing an additional circuit whenever the manually turnable member is moved to either of its extreme positions.

While switches of the types shown in my aforesaid applications are in many respects satisfactory, and fall within the scope of the invention set forth in the present application, there is herein disclosed an improved form of switching mechanism which does not require sliding contacts and in which standard quick make and break switches are employed.

Another object of my invention is to incorporate in a device of this nature indicating means which will inform the operator whether or not the motors controlled by the switch have rotated the desired number of revolutions.

A still further object of my invention is to provide a unitary assemblage of switching mechanism, an electric motor therefor and suitable gearing connecting the motor to the mechanism.

Further objects and advantages will be apparent from the following description considered in connection with the accompanying drawings, which form a part of this specification, and of which:

Figure 1:
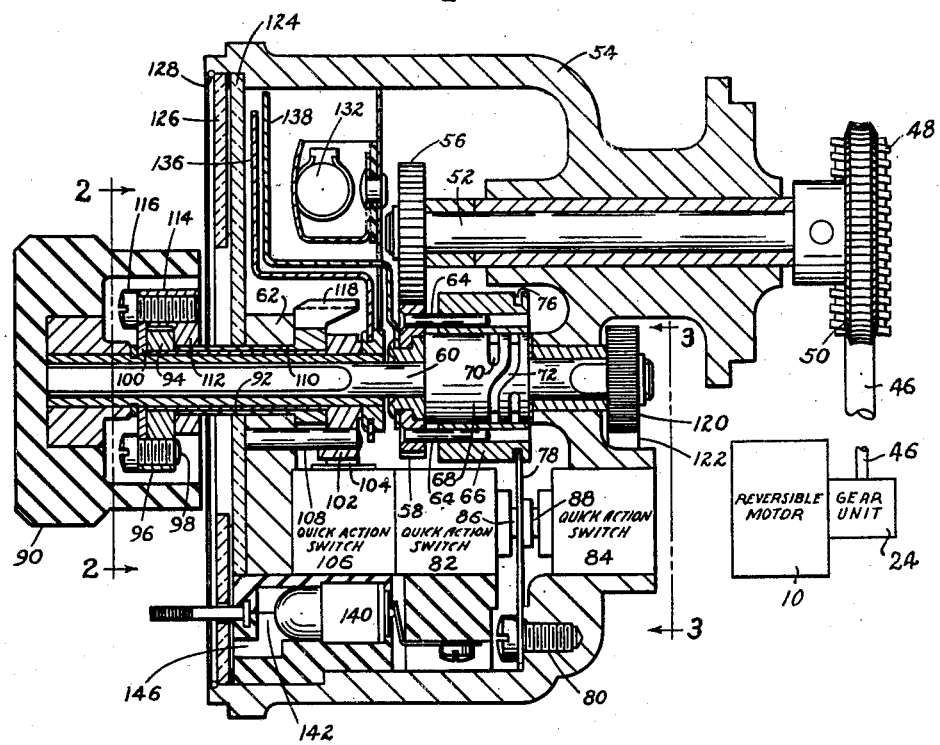
Fig. 1 is a cross-sectional view of the switching mechanism, the driving motor therefore being shown diagrammatically.

Referring to the figures, reference character 10 designates diagrammatically a reversible electric motor. This motor drives a shaft 46 through a suitable gear reduction 24. Shaft 46 carries a worm 48 which meshes with a worm gear 50 mounted on a shaft 52 which is rotatably carried in an end wall of a switch housing 54.

The opposite end of shaft 52, which extends within the switch housing, carries a spur gear 56 which meshes with a similar gear 58 rotatably mounted on a shaft 60. This shaft is rotatably supported in a bracket 62 adjacent to the front end of the switch housing 54.

Figure 4:
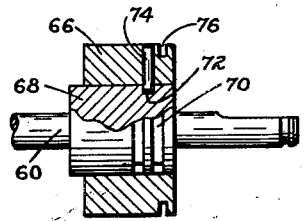
Fig. 4 is a view, partially in cross section, of a portion of the device shown in Fig. 1.

Rigidly fixed to gear 58 are two or more pins 64 upon which is slidably mounted a collar 66. This collar surrounds a cylindrical cam member 68 which is fixed to the inner end of shaft 60. The cam member is formed with a cam groove 70 in its cylindrical surface. This groove is made up of two circular parallel portions, each of which extends somewhat less than 360 degrees around the cylinder, and a spiral portion 72 which connects one end of one circular portion with the opposite end of the other circular portion. The collar 66 carries a radially extending pin 74, shown in Fig. 4, which projects into the cam groove 70, the collar and pin thus constituting a cam follower.

The outer circumference of the collar 66 is formed with an annular groove 76 into which extends one end of a leaf spring 78, the other end of the spring being secured to the housing 54 by means of the bolt 80.

Located on opposite sides of the spring 78 are electric switches 82 and 84. These switches may be of standard construction and consequently have not been shown in detail. However, they are of the quick make and break push button or plunger type, having plungers 86 and 88, respectively, which bear against opposite sides of the spring. These plungers are urged toward the spring by means of coil springs or the like included in the switch mechanism and the arrangement is such that when the plunger is forced inwardly against the force of the coil spring, the circuit through the switch is closed, and is opened when external pressure on the plunger is relieved thus permitting the coil spring to force the plunger outwardly.

Suitably secured to the forward end of the shaft 60 is a manually turnable knob 90. Surrounding the shaft 60 is a sleeve 92 to the forward end of which there is fixed a ring 94. This ring is generally circular, but is formed with a radially projecting lug 96 which is threaded to receive a set screw 98, as is shown more particularly in Figs. 1 and 2. Rigidly secured to the shaft 60 is a disc 100 having an outer diameter such that it is substantially tangent to the threaded portion of the set screw 98, whereby the head of the set screw overlies the edge of the disc. Consequently, if the set screw is loosened, the ring 94 and hence the sleeve 92 may be rotated with respect to the shaft 60 and the disc 100, but tightening of the set screw serves to clamp all these members together. The inner end of the sleeve 92 carries an arm 102, which is arranged to strike the plunger 104 on an electric switch 106 of the same type as switches 82 and 84. This switch is located directly beneath the shaft 60 so that the arm 102 strikes the plunger when the arm is turned to a substantially vertical position. A pin 108 projects inwardly from the bracket 62 of the switch housing and acts as a stop to limit rotation of the arm 102 and hence the shaft 60, the pin stopping the rotation of these members when the arm actuates the switch 106.

Surrounding the sleeve 92 is a sleeve 110 to the forwarding end of which is secured a ring 112. This ring is provided with a lug 114, which is similar to the lug 96 on ring 94, but has sufficient axial extent in a forward direction to overlie the ring 94 and abut against the disc 100. A set screw 116 is threaded into the lug 114, the head of the screw contacting the disc 100 so as to lock the ring 112 in adjusted position with respect to the disc. The inner end of the sleeve 110 is provided with an arm 118 which is similar to arm 102, except that it has an axially offset portion extending into the same radial plane as that occupied by the arm 102 in order that the arm 118 may contact the plunger 104 on the switch 106. The pin 108 acts as a stop for the arm 118 as well as for the arm 102.

During operation of the device the set screws 98 and 116 remain tight and the arms 102 and 118 are firmly fixed with respect to each other and to the shaft 60 and consequently all these members turn as a unit when the knob 90 is rotated. However, the angular position of either arm relative to the other and to the shaft 60 may be adjusted by loosening the proper set screw, whereupon the arm and the sleeve to which it is attached may be rotated relative to the shaft. In this way, the angle through which the shaft may be rotated before it is stopped by one or the other of the arms contacting the pin 108 may be adjusted.

Figure 3:
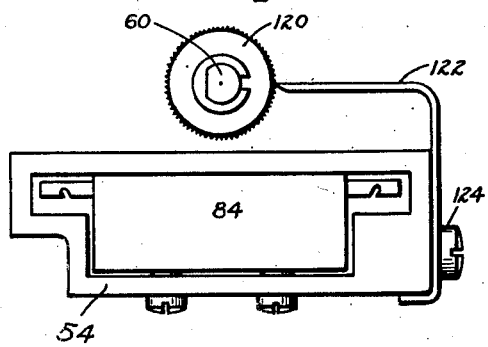
Fig. 3 is an end view of a portion of the device shown in Fig. 1, and is taken in the direction of the arrows 3—3.

The rear end of shaft 60 extends through the rear wall of the casing and is provided with a knurled knob 120. A spring member 122 has one end secured to the casing by means of the screw 124, while the other end bears against the knurled knob 120, as shown in Fig. 3. The purpose of this is to provide resistance to the turning of the shaft 60 in order that the latter will not be turned accidentally, as by jarring or as a result of frictional drag on the cam 68 resulting from rotation of the cam follower.

Figure 5:
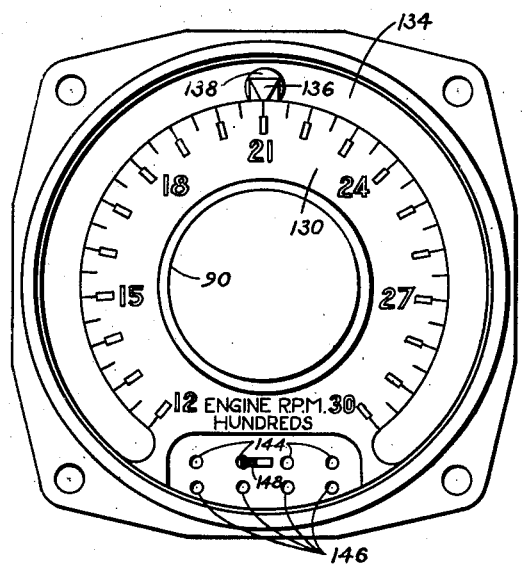
Fig. 5 is a front view of the control knob and dial.
Figure 6:
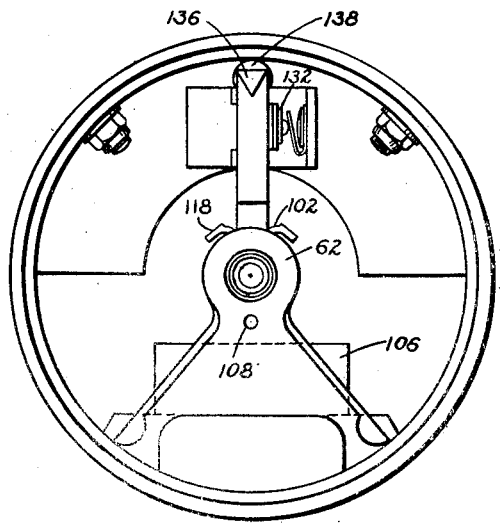
Fig. 6 is a view similar to Fig. 5, but with the knob and dial removed.

The front end of the casing 54 is provided with a transparent dial 124 in front of which is arranged a transparent dial cover 126, both of which are held in place by means of a snap ring 128. The dial 124 may be provided with suitable calibrations, as is shown in Fig. 5. As here shown, the dial is calibrated in engine speeds from 1200 to 3000 R. P. M. The annular portion 130 of the dial which carries the calibrations is preferably made opaque except for the calibrations, so that the light from the bulb 132 will clearly illuminate calibrations on the dial. The portion 134 of the dial radially outside of the band 130 is transparent, so that the outer ends of indicators 136 and 138 are visible therethrough. Indicator 136 is fixed to the shaft 60 so as to be rotated by turning of the shaft and consequently it indicates the position of the shaft. Its outer visible end may have a triangle painted thereon, as shown in Fig. 6. Indicator 138 is secured to pinion 58 and hence rotates with the cam follower so as to indicate the position of the latter. As shown in Fig. 6, the outer visible end of this indicator may be formed as a circle.

Figure 2:
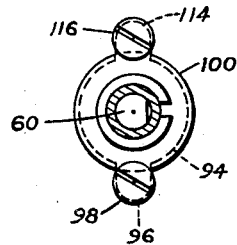
Fig. 2 is a cross-sectional view taken on the line 2—2 of Fig. 1.

Located in the lower part of the switch housing 54 is a plurality of signal lamps, one of which is designated by reference character 140 in Fig. 1. Each lamp is located in a separate compartment 142, each of which is provided with a centrally located passage 144 and an offset passage 146, the outer ends of which are visible through the transparent portion of the dial. A slidable shutter, movable by means of a handle 148, is provided for closing the passages 144 when desired in order that direct rays from the lamps will not be visible, as such rays would destroy the night vision of the pilot. While these signal lights are conveniently located in the switch housing, they form no part of the present invention, and hence further detailed description thereof is not believed to be necessary.

The above-described device operates as follows:

With the switch parts in the positions shown in the drawings, namely with the indicator arms 136 and 138 parallel to each other and standing at 2100 on the dial, the engine or engines of the aircraft are rotating at 2100 R. P. M. If, for instance, the pilot wishes to increase the speed of the engine or engines to 2400 R. P. M., he turns the knob 90 in a clockwise direction until the indicator 136, which is secured to the shaft 60, stands at 2400 on the dial. Rotation of the shaft 60 also rotates the cam 68. Consequently, the pin 74, which is located in the center of the spiral portion 72 of the cam groove 70 when the indicators 136 and 138 are parallel, is displaced axially with respect to the cam, inasmuch as the collar 66 cannot be rotated because of the irreversible worm gearing including the gears 48 and 50. Rotation of the shaft 60 in a clockwise direction as viewed in Fig. 5, causes the pin 74 and the collar 66 to be displaced axially on the pins 64 towards the right as viewed in Fig. 1. This in turn displaces the upper end of the leaf spring 78 towards the right and depresses the plunger 80 of switch 84. A circuit is thus completed through the switch which, acting through a suitable system of relays, for instance, as disclosed in my Patent No. 2,400,580, causes rotation of the electric motor 10, as well as the synchronous rotation of similar electric motors which change the adjustment of the governors which control the speeds of the engines of the aircraft. The motor 10 rotates in a proper direction so as to rotate the collar 66 in the same direction that the cam 68 was rotated. When the motor has rotated a sufficient number of revolutions to turn the collar 66 through the same angle as the cam was originally rotated, the pin 74 will again occupy the center of the spiral portion 72 of the cam slot, and hence the collar 66 will be displaced axially to the left on the pins 64 to its intermediate or neutral position. Hence, the spring 78 will be restored to its neutral position and the plunger 86 of the switch 84 released so as to open the switch and stop the electric motors. Rotation of the collar 66 also rotates the indicator 138 through the same angle that the shaft 60 was originally rotated, and hence it will come to rest parallel with the indicator 166. Meanwhile, the motors associated with the governors have rotated the same number of revolutions as the switch motor, and the governors are so designed that this causes an increase in engine speed from 2100 R. P. M. to 2400 R. P. M.

Obviously, the further the cam 68 is turned by the knob 90, the greater the number of revolutions required of the electric motor 10 to drive the cam follower through a like angle, and hence the greater the number of revolutions performed by the motors associated with the engine governors and the greater the speed change effected thereby.

If for any reason there should be a failure in the electrical system which prevents the electric motors from starting or performing the proper number of revolutions, this would at once be apparent to the pilot, inasmuch as the indicator arm 138 would not move at all, or would not move all the way into parallelism with the indicator 136 in the new position of the latter. In other words, the indicator 136 designates the engine speed desired by the pilot, while the indicator 138 designates the actual engine speed.

If it is desired to reduce the speed of the engines, the knob 90 is turned in the opposite direction until the indicator 136 stands at the desired speed on the dial. This turns the cam 68 in the opposite direction from that previously described, and consequently, the pin 74 in moving out of the spiral portion of the slot displaces the collar 66 to the left. Hence, the spring 78 is moved to the left, as viewed in Fig. 1, thus depressing the plunger 86 of switch 82, which closes a circuit through this switch. Closure of this switch causes the electric motors to operate in the reverse direction from that previously described. The motors associated with the engine governors hence alter the governor settings so as to reduce the engine speed, while the motor 10 drives the collar 66 so as to restore the pin 74 to the center of the spiral portion 72 of the cam slot. This in turn restores the spring 78 to its central position, thus opening the switch 82 and stopping the electric motors.

In accordance with the circuits disclosed in my aforesaid Patent No. 2,400,580, it is possible to individually operate the electric motors associated with the engine governors so as to cause the different engines in a multi-engine ship to rotate at different speeds. Such control is by individual switches usually located in the flight engineer's compartment. However, it is desirable that the pilot be able to resynchronize all of the engines at either their maximum or minimum speeds, and this may be done by means of a single switch which is closed whenever the knob 90 is turned to either of its limit positions. Thus, if the knob 90 is turned as far as it will go in a clockwise direction, the arm 118 strikes the pin 108, thus preventing further rotation of the shaft and knob. At the same time, the arm 118 strikes the plunger 104 of the switch 106. Meanwhile, rotation of the cam 68 has displaced the collar 66 to the right, thus closing the switch 84 and the closure of the switch 106 at the same time the switch 84 is closed results in the different engines being synchronized at the maximum speed. Likewise, if the knob 90 is turned all the way in a counter-clockwise direction, the arm 102 strikes the pin 100 so as to stop further rotation, and the arm also actuates the switch 106. The electric circuits are such that if the switch 106 is closed at the same time the switch 82 is closed, the engines are synchronized at their minimum speed. A complete description of the circuits for accomplishing this is given in my aforesaid Patent No. 2,400,580, but inasmuch as these circuits form no part of the invention as herein claimed, they have not been described.

As previously explained, the maximum arc through which the shaft 60 may be rotated is adjustable by means of the arms 102 and 118. Thus, if the switch were to be used on an aircraft employing engines having a maximum speed of, for instance, 2800 R. P. M., the arm 118 would be so adjusted as to strike the stop pin 108 and to actuate the switch 106 when the indicator 136 stands at 2800 on the dial. Likewise, if the minimum speed of the engines was, for instance, 1500 R. P. M., the arm 102 would be so adjusted as to stop the rotation of the shaft and to actuate the switch 106 when the indicator 136 stands at 1500 on the dial. In this way, the dial may be calibrated for the greatest range of engine speeds likely to be encountered and may still be used on ships having a lesser range of engine speeds.

While I have shown and described one more or less specific embodiment of my invention, it is to be understood that this has been done for the purpose of illustration only and is not to be considered as limiting the scope of my invention which is to be determined from the appended claims.

What I claim is:

1. In a switching mechanism, a rotatably mounted cam, a cam follower associated therewith, means for mounting said follower for axial and rotational movement with respect to said cam, said cam having a profile including two axially spaced prolonged dwells connected by an inclined portion, said follower having a neutral position at the center of said inclined portion whereby rotation of the cam in one direction initially displaces said follower axially in one direction from the neutral position and thereafter retains the follower in the displaced position and rotation of the cam in the opposite direction initially displaces said follower axially in the opposite direction from said neutral position, means for rotating said follower in the proper direction to reestablish the original relative rotative position of the follower and cam whereby to return said follower to its neutral axial position, a pair of quick action electric switches, means responsive to axial displacement of said follower in one direction for actuating one of said switches and responsive to axial displacement of said follower in the opposite direction for actuating the other of said switch, the last-mentioned means restoring whichever switch has been actuated to its original condition upon return of said follower to its neutral position, means for preventing either said cam or said follower from imparting rotary motion to the other, a pair of arms rotatable with said cam and individually rotatably adjustable with respect to said cam, and stop means engageable by said arms to thereby establish opposite individually adjustable extreme positions for said cam.

2. The switching mechanism as set forth in claim 1 including a quick action electric switch arranged to be actuated by either of said arms when the respective arm engages said stop means.

ERIC C. WAHLBERG.

REFERENCES CITED

The following references are of record in the file of this patent:

UNITED STATES PATENTS

| Number | Name | Date |
|---|---|---|
| 385,259 | Fiske | June 26, 1888 |
| 404,867 | Ricketson | June 11, 1889 |
| 1,078,815 | Wiegand | Nov. 18, 1913 |
| 1,684,315 | Haller | Sept. 11, 1928 |
| 1,848,136 | Meissner | Mar. 8, 1932 |
| 1,883,163 | Van Voorhis | Oct. 18, 1932 |
| 2,038,322 | Thomas | Apr. 21, 1936 |
| 2,351,451 | Obszarny | June 13, 1944 |

FOREIGN PATENTS

| Number | Country | Date |
|---|---|---|
| 318,223 | France | June 19, 1902 |
| 686,540 | Germany | Jan. 11, 1940 |